UNITED STATES PATENT OFFICE.

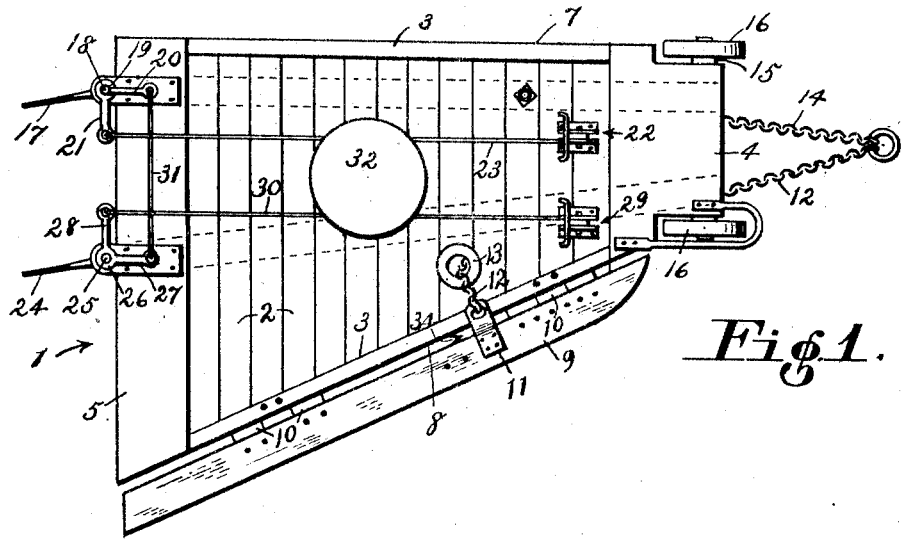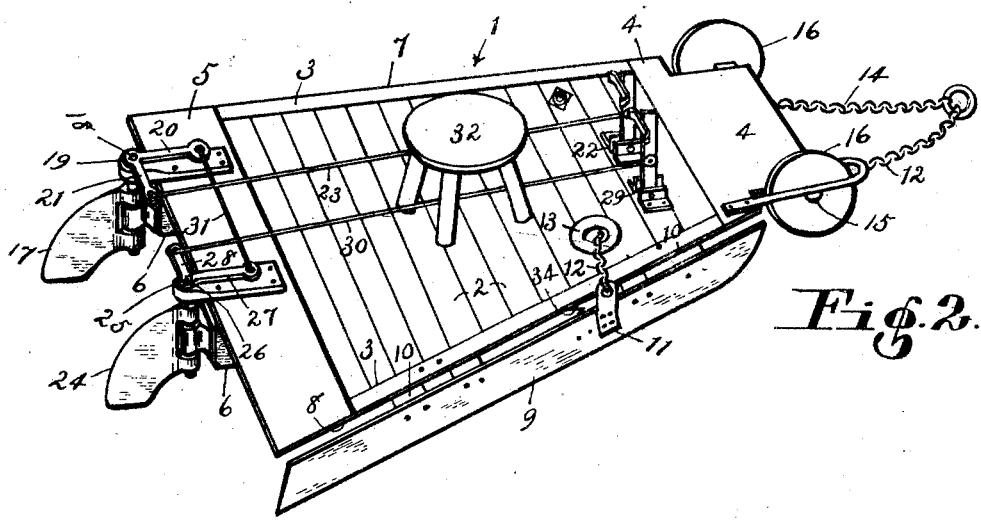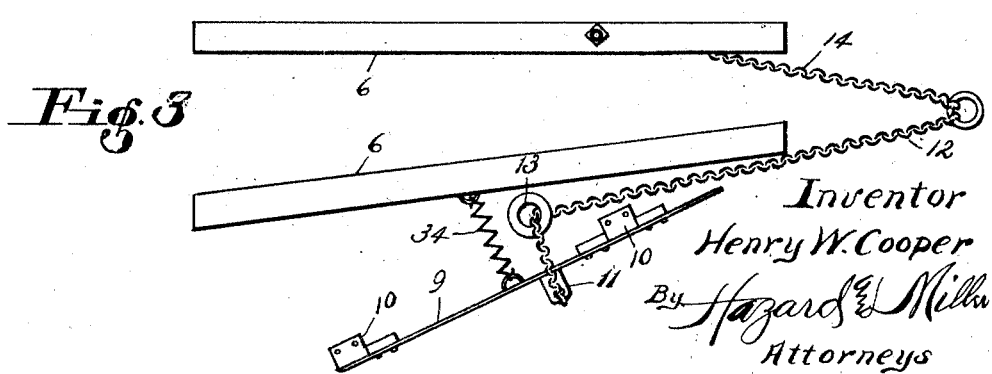

HENRY W. COOPER, OF WILMINGTON, CALIFORNIA.

CORN-CUTTER.

1,367,126.  Specification of Letters Patent.  Patented Feb. 1, 1921.

Application filed February 16, 1920.  Serial No. 359,150.

*To all whom it may concern:*

Be it known that I, HENRY W. COOPER, a citizen of the United States, residing at Wilmington, in the county of Los Angeles and State of California, have invented new and useful Improvements in Corn-Cutters, of which the following is a specification.

My invention relates to a device for cutting rows of corn stalks in a field, and an object of my invention is to provide a corn stalk cutter having means for guiding the device between the rows of corn, a second object being to provide in such a device a means for disposing of the knife which is used for cutting the stalks. Other objects will appear hereinafter.

Figure 1 is a top view of the entire device showing a cutting blade extending outwardly in operative position.
Fig. 2 is a perspective view of the entire device showing a cutting blade extending downwardly out of operative position.

Fig. 3 is a fragmentary view in perspective of a blade and means for throwing the blade into operative position.

In carrying out my invention a drag platform 1 is provided comprising cross boards 2 properly held together by cleats 3 and being further reinforced by a front end piece 4 and a rear end piece 5, there being two beams 6—6 disposed longitudinally of the platform and on the under side thereof.

One side 7 of the platform is substantially straight, and the front and rear ends being formed at right angles to the side 7 while the side 8 opposite the side 7 extends diagonally from the front end to the rear end, the front being considerably narrower than the rear end.
A cutting blade 9 is mounted by hinges 10—10 to the edge 8 of the platform there being an arm 11 fixed to the blade. A chain 12 is connected to the outer end of the arm 11 and extends through an eye 13 in the platform and from the eye 13 extends forwardly of the front end of the platform. A second chain 14 is fixed to the platform at the side 7 and extends forwardly of the front end thereof and connects with the chain 12 forming a means by which the drag may be drawn. On the front end of the drag is mounted an axle 15 carrying tread wheels 16—16. At the rear of the drag is mounted a rudder 17 disposed rearwardly and downwardly from a rudder post 18. On the rudder post is fixed a bell crank 19 having an arm 20 and an arm 21. At the forward end of the platform is mounted a lever 22 which is connected with the arm 21 of the bell crank by a rod 23. A second rudder 24 is mounted upon a rudder post 25 which carries a bell crank 26 having the arms 27 and 28. At the forward end of the platform is mounted a second lever 29 being connected with the arm 28 of the bell crank by a rod 30. The arm 20 of the bell crank 19 and the arm 27 of the bell crank 26 are also connected with each other by a link 31. An adequate seat 32 is placed upon the platform adapted for use by a driver of the device.

The device is adapted to be drawn by a single horse, the horse walking between the rows of corn in a field. Heretofore with devices of this character it has been found difficult to guide the drag so that the knife will operate upon a row of stalks continuously and not be thrown away from the row by the knife coming in contact with the stalks. This is also true where it is necessary to cut corn on sloping ground the slope of the ground causing the device to slide away from the path upon which it is intended to travel.

In the present invention the rudders 17 and 24 are provided and adapted to contact with the ground to prevent the rear end of the device from skidding away from the work.

In the practical operation of the device, a horse being hitched to the chains 12 and 14 and a driver mounted upon the seat 32, the device is then drawn in between the rows of corn and the rudders 17 and 24 operated by the feet of the driver upon the levers 22 and 29 to guide the device so that the blade 9 will properly contact with the row of corn to be cut; or should the device be operating upon a side hill it can be prevented from skidding down hill by the same means.

The cutter is also provided with means for disposing of the cutting blade 9 in order that the horse when turning about in close quarters and moving beside the cutter will not be cut thereby, or the driver should he dismount from the device be placed in jeopardy by the sharp blade. This means of disposing of the knife or placing it in position where it can do no harm when not in use comprises the arm 11 and chain 12 which is drawn taut when the horse is drawing the drag, but which becomes slackened when the horse stops pulling, and when the chain 12 becomes slackened the hingedly mounted blade drops downwardly. The blade may drop downwardly by gravity, but in order to insure its downward movement when the chain 12 becomes slack, a spring 34 is disposed underneath of the drag one end being connected toward the side 7 and the other end being connected to the blade 9 to influence its downward movement.

Thus I have produced a corn cutter carrying a blade that can be safely disposed of when not in use and having means for holding the cutter to the work in hand, the exact form of the cutter and of the guiding rudders forming no part of my present invention.

Various changes may be made without departing from the spirit of my invention as claimed.

I claim:

1. In a corn cutter a drag adapted to be drawn between rows of corn, a stalk cutting knife fixed to the drag, and manually operable guide means for directing the course of the drag.

2. In a corn cutter a drag adapted to be drawn between rows of corn, a stalk cutting knife fixed to the drag, and manually operable ground contact means for directing the course of the drag.

3. In a corn cutter, a drag adapted to be drawn between rows of standing corn, a knife fixed to the drag and adapted to cut the stalks of corn, and individual means for holding the drag against the row of corn being operated upon.

4. In a corn cutter, a drag adapted to be drawn between rows of standing corn, a knife fixed to the drag and adapted to cut the stalks of corn, and individual means contacting with the ground for holding the rear end of the drag in a line of travel whereby the knife will engage the row of stalks.

5. In a corn cutter, a drag adapted to be drawn between rows of standing corn, a knife fixed to the drag and adapted to cut the stalks of corn, rudders fixed to the rear end of the drag and adapted to contact with the ground, and manual means for moving the rudders to guide the drag.

6. In a corn cutter, a drag adapted to be drawn between rows of standing corn, a knife hingedly mounted upon one edge of the drag, rudders disposed at the rear end of the drag adapted to contact with the ground, and means for moving the rudders to guide the drag.

7. In a corn cutter, a drag adapted to be drawn between rows of standing corn, a knife hingedly mounted upon one edge of the drag, rudders disposed at the rear end of the drag, means for operating the rudders to guide the drag, and means for holding the knife in an operative position while the drag is being drawn and whereby when the drag is not being drawn the knife will be disposed downwardly out of operative position.

8. In a corn cutter, in combination, a drag comprising a platform, rudders mounted upon rudder posts at the rear end of the platform, bell cranks fixed to the rudder posts, levers positioned upon the platform, rods connecting the levers with the bell cranks, a link connecting the bell crank of one rudder with the bell crank of the other, a blade hingedly mounted upon one edge of the platform and diagonally disposed from the front to the rear, the front end of the platform being more narrow than the rear end thereof, an arm fixed to the blade and extending upwardly therefrom, an eye formed in the platform adapted to receive a chain, a chain fixed to the arm of the blade and extending through the eye of the platform and forwardly of the front end thereof, a second chain fixed to the drag and extending forwardly of the front end thereof forming a means for drawing the platform, an axle mounted at the front end of the platform and transversely thereof, wheels upon the axle, and a spring connected with the hingedly mounted blade and with the platform whereby when the drawing chains of the platform become slack the blade will be caused to turn downwardly.

In testimony whereof I have signed my name to this specification.

HENRY W. COOPER.